US009950616B2

(12) United States Patent
Yager et al.

(10) Patent No.: US 9,950,616 B2
(45) Date of Patent: Apr. 24, 2018

(54) DEPLOYABLE FUEL TANK BAFFLE AND FUEL TANK SYSTEM

(76) Inventors: Jeffrey Yager, Lasalle (CA); James D. Anchak, Jr., Beverly Hills, MI (US); Michael Grant Lieblang, Macomb, MI (US)

( * ) Notice: Subject to any disclaimer, the term of this patent is extended or adjusted under 35 U.S.C. 154(b) by 1270 days.

(21) Appl. No.: 13/990,783

(22) PCT Filed: Dec. 2, 2011

(86) PCT No.: PCT/US2011/062988
§ 371 (c)(1),
(2), (4) Date: Jul. 25, 2013

(87) PCT Pub. No.: WO2012/075355
PCT Pub. Date: Jun. 7, 2012

(65) Prior Publication Data
US 2014/0144914 A1    May 29, 2014

Related U.S. Application Data

(60) Provisional application No. 61/419,708, filed on Dec. 3, 2010.

(51) Int. Cl.
*B60K 15/077*    (2006.01)
*B62J 35/00*    (2006.01)
(Continued)

(52) U.S. Cl.
CPC ...... *B60K 15/077* (2013.01); *B60K 15/03177* (2013.01); *B62J 35/00* (2013.01);
(Continued)

(58) Field of Classification Search
CPC .......... B60K 15/077; B60K 2015/0775; B60K 2015/0777; B60K 2015/0344; B65P 3/2235; F02M 37/0088; Y10T 137/86212
(Continued)

(56) References Cited

U.S. PATENT DOCUMENTS 2,552,119 A  *  5/1951  Scharenberg .......... B64D 37/06
                                                        220/4.15
3,896,964 A     7/1975  Takei et al.
(Continued)

FOREIGN PATENT DOCUMENTS

AU     198779370      1/1988
CA       1110582     10/1981
(Continued)

OTHER PUBLICATIONS

International Search Report and Written Opinion, Int'l Application No. PCT/US2011/062988, dated Apr. 13, 2012.

*Primary Examiner* — King M Chu
*Assistant Examiner* — Blaine Neway
(74) *Attorney, Agent, or Firm* — Miller Canfield

(57) ABSTRACT

A fuel tank baffle assembly is provided for installation in a fuel tank, the baffle assembly comprising a main body having a first end section, a second end section, and an intermediate section interconnecting the first and second end sections. Operably associated with the main body is at least one deployable auxiliary baffle structure. The auxiliary baffle structure is configured to be positioned in an undeployed state during installation into a fuel tank, thereby defining a first installation width of the baffle assembly. Following installation, the auxiliary baffle structure is deployed into an extended position, thereby defining an operational width for subsequent usage. The operational width is greater than the installation width.

19 Claims, 9 Drawing Sheets

(51) Int. Cl.
  *F02M 37/00* (2006.01)
  *B60K 15/03* (2006.01)
  *B29L 31/00* (2006.01)
  *B29C 49/20* (2006.01)
  *B29C 65/48* (2006.01)
  *B29C 65/00* (2006.01)
  *B29C 65/02* (2006.01)
  *B29C 49/04* (2006.01)
  *B29C 49/00* (2006.01)
  *B29C 49/48* (2006.01)

(52) U.S. Cl.
  CPC ......... *F02M 37/0088* (2013.01); *B29C 49/04* (2013.01); *B29C 49/20* (2013.01); *B29C 65/02* (2013.01); *B29C 65/48* (2013.01); *B29C 66/1312* (2013.01); *B29C 66/532* (2013.01); *B29C 66/54* (2013.01); *B29C 66/61* (2013.01); *B29C 66/7234* (2013.01); *B29C 66/73921* (2013.01); *B29C 2049/0057* (2013.01); *B29C 2049/2078* (2013.01); *B29C 2049/4807* (2013.01); *B29L 2031/7172* (2013.01); *B60K 2015/03032* (2013.01); *B60K 2015/0344* (2013.01); *B60K 2015/0346* (2013.01); *B60K 2015/0775* (2013.01)

(58) Field of Classification Search
  USPC ........................................................ 220/563
  See application file for complete search history.

(56) References Cited

U.S. PATENT DOCUMENTS

| | | | |
|---|---|---|---|
| 3,954,369 A | 5/1976 | Kormendi | |
| 4,179,036 A | 12/1979 | Pasini | |
| 4,231,719 A | 11/1980 | Ringwald et al. | |
| 4,305,416 A | 12/1981 | Henning et al. | |
| 4,324,272 A | 4/1982 | Parks et al. | |
| 4,424,839 A | 1/1984 | Otani et al. | |
| 4,526,286 A | 7/1985 | Jung et al. | |
| 4,527,407 A | 7/1985 | Shanklin | |
| 4,550,848 A * | 11/1985 | Sucato | A45F 3/16 181/264 |
| 4,570,740 A | 2/1986 | Hara | |
| 4,646,772 A | 3/1987 | Bergsma | |
| 4,657,156 A | 4/1987 | Uranishi et al. | |
| 4,719,072 A | 1/1988 | Kojima et al. | |
| 4,764,408 A | 8/1988 | Stedman et al. | |
| 4,802,514 A | 2/1989 | Morse | |
| 4,840,732 A | 6/1989 | Rawlins | |
| 4,854,469 A | 8/1989 | Hargest | |
| 4,858,778 A | 8/1989 | Patrick | |
| 4,891,000 A | 1/1990 | Ishii | |
| 4,952,347 A | 8/1990 | Kasugai | |
| 4,971,219 A | 11/1990 | Dombeck et al. | |
| 4,974,743 A | 12/1990 | Sasaki et al. | |
| 4,978,027 A | 12/1990 | Larson | |
| 5,031,795 A * | 7/1991 | Kotera | B60K 15/077 220/501 |
| 5,127,432 A | 7/1992 | Duhaime et al. | |
| 5,199,389 A | 4/1993 | Wolf et al. | |
| 5,326,514 A | 7/1994 | Linden et al. | |
| 5,394,344 A | 2/1995 | Lippmann et al. | |
| 5,445,783 A | 8/1995 | Irish et al. | |
| 5,456,108 A | 10/1995 | Birkett | |
| 5,483,109 A | 1/1996 | Gholston | |
| 5,507,324 A | 4/1996 | Whitley, II et al. | |
| 5,522,425 A | 6/1996 | Kroiss et al. | |
| 5,638,874 A | 6/1997 | Thompson | |
| 5,681,629 A | 10/1997 | Wouters et al. | |
| 5,694,968 A | 12/1997 | Devall et al. | |
| 5,848,720 A | 12/1998 | Logan | |
| 5,850,933 A | 12/1998 | Pazik | |
| 5,891,385 A | 4/1999 | Cerbelle et al. | |
| 6,035,884 A | 3/2000 | King et al. | |
| 6,039,203 A | 3/2000 | McDaniel | |
| 6,135,306 A | 10/2000 | Clayton et al. | |
| 6,138,857 A | 10/2000 | Keller | |
| 6,138,859 A * | 10/2000 | Aulph | B60K 15/03 137/574 |
| 6,276,201 B1 | 8/2001 | Gette et al. | |
| 6,293,420 B1 | 9/2001 | Richter et al. | |
| 6,311,675 B2 | 11/2001 | Crary et al. | |
| 6,338,420 B1 | 1/2002 | Pachciarz et al. | |
| 6,405,747 B1 | 6/2002 | King et al. | |
| 6,408,979 B1 * | 6/2002 | Forbes | G10K 11/16 181/198 |
| 6,418,984 B1 | 7/2002 | Korst et al. | |
| 6,467,514 B1 | 10/2002 | Korst et al. | |
| 6,491,180 B2 | 12/2002 | Distelhoff et al. | |
| 6,499,620 B1 | 12/2002 | Boguet et al. | |
| 6,510,958 B2 | 1/2003 | Low et al. | |
| 6,551,509 B2 | 4/2003 | Appleton | |
| 6,595,239 B1 | 7/2003 | Korst et al. | |
| 6,637,457 B2 | 10/2003 | Evanovich et al. | |
| 6,661,339 B2 | 12/2003 | Muirhead | |
| 6,691,889 B1 | 2/2004 | Falk | |
| 6,712,234 B2 | 3/2004 | Boecker | |
| 6,736,282 B2 * | 5/2004 | Krogull | B60K 15/077 220/563 |
| 6,782,122 B1 | 8/2004 | Kline et al. | |
| 6,814,921 B1 | 11/2004 | Van Schaftingen et al. | |
| 6,860,398 B2 | 3/2005 | Potter et al. | |
| 6,893,603 B2 | 5/2005 | Rohde et al. | |
| 6,948,511 B2 | 9/2005 | Taurel et al. | |
| 6,969,485 B2 | 11/2005 | Vorenkamp et al. | |
| 6,978,802 B2 | 12/2005 | Hagano et al. | |
| 7,108,056 B1 | 9/2006 | Moghaddam et al. | |
| 7,166,253 B2 | 1/2007 | Van Schaftingen et al. | |
| 7,261,323 B2 | 8/2007 | Grant | |
| 7,290,675 B2 | 11/2007 | Gombert et al. | |
| 7,455,190 B2 | 11/2008 | Potter et al. | |
| 7,568,592 B2 | 8/2009 | Miyauchi et al. | |
| 7,780,901 B2 | 8/2010 | Masse et al. | |
| 7,789,987 B2 | 9/2010 | Nemoto | |
| 7,861,885 B2 | 1/2011 | Borchert et al. | |
| 7,993,127 B2 | 8/2011 | Hamaji et al. | |
| 8,003,041 B2 | 8/2011 | Borchert et al. | |
| 8,122,604 B2 | 2/2012 | Jannot et al. | |
| 8,147,232 B2 | 4/2012 | Borchert et al. | |
| 8,163,228 B2 | 4/2012 | Criel et al. | |
| 8,202,078 B2 | 6/2012 | Aoki et al. | |
| 8,282,875 B2 | 10/2012 | Roos et al. | |
| 8,329,082 B2 | 12/2012 | Borchert et al. | |
| 8,608,012 B2 * | 12/2013 | Aoki | B29C 49/20 220/562 |
| 2002/0105115 A1 | 8/2002 | Sadr | |
| 2003/0015537 A1 | 1/2003 | Konja | |
| 2003/0136507 A1 | 7/2003 | Thiel et al. | |
| 2004/0096611 A1 | 5/2004 | Lucke et al. | |
| 2004/0129708 A1 | 7/2004 | Borchert et al. | |
| 2005/0040567 A1 | 2/2005 | Knueppel et al. | |
| 2005/0048218 A1 | 3/2005 | Weidman | |
| 2006/0071120 A1 | 4/2006 | Selin et al. | |
| 2007/0017918 A1 | 1/2007 | Kirk et al. | |
| 2008/0006625 A1 | 1/2008 | Borchert et al. | |
| 2008/0014390 A1 | 1/2008 | Scott et al. | |
| 2009/0026664 A1 | 1/2009 | Criel et al. | |
| 2009/0065513 A1 | 3/2009 | Kraemer | |
| 2009/0134174 A1 | 5/2009 | Kang et al. | |
| 2009/0139994 A1 | 6/2009 | Aoki et al. | |
| 2009/0152263 A1 | 6/2009 | Criel et al. | |
| 2009/0162472 A1 | 6/2009 | Aoki et al. | |
| 2009/0166367 A1 | 7/2009 | Blieux et al. | |
| 2009/0189384 A1 | 7/2009 | Schoen et al. | |
| 2009/0206097 A1 | 8/2009 | Gebert et al. | |
| 2009/0230133 A1 | 9/2009 | Takeuchi et al. | |
| 2009/0250458 A1 | 10/2009 | Criel et al. | |
| 2009/0309270 A1 | 12/2009 | Buchholz et al. | |
| 2009/0324866 A1 | 12/2009 | Bocker et al. | |
| 2010/0139842 A1 | 6/2010 | Criel et al. | |
| 2010/0212806 A1 | 8/2010 | Lemoine et al. | |
| 2011/0129560 A1 | 6/2011 | Borchert et al. | |

(56) References Cited

U.S. PATENT DOCUMENTS

| | | |
|---|---|---|
| 2011/0139128 A1 | 6/2011 | Zhang et al. |
| 2011/0266723 A1 | 11/2011 | Criel et al. |
| 2011/0315308 A1 | 12/2011 | Borchert et al. |
| 2012/0013048 A1 | 1/2012 | Bienhuls et al. |
| 2012/0161373 A1 | 6/2012 | Heim et al. |
| 2013/0025778 A1 | 1/2013 | Rohde et al. |

FOREIGN PATENT DOCUMENTS

| | | |
|---|---|---|
| CA | 1133428 | 10/1982 |
| CA | 1319646 | 6/1989 |
| CA | 2290199 | 6/2000 |
| CA | 2075385 | 8/2001 |
| CA | 2641463 | 8/2007 |
| CA | 2654106 | 1/2008 |
| CN | 1160650 | 10/1997 |
| CN | 1114756 | 7/2003 |
| DE | 2539758 | 12/1977 |
| DE | 3641274 | 6/1987 |
| DE | 2847117 | 8/1988 |
| DE | 3727086 | 9/1988 |
| DE | 3225929 | 1/1994 |
| DE | 3627109 | 9/1994 |
| DE | 3627116 | 9/1994 |
| DE | 4307949 | 9/1994 |
| DE | 4426685 | 3/1995 |
| DE | 29609441 | 10/1996 |
| DE | 4206214 | 2/1997 |
| DE | 19547154 | 6/1997 |
| DE | 19602818 | 7/1997 |
| DE | 19955133 | 5/2001 |
| DE | 10010900 | 9/2001 |
| DE | 19701294 | 10/2001 |
| DE | 10055660 | 5/2002 |
| DE | 10237187 | 7/2003 |
| DE | 10260952 | 11/2008 |
| EP | 0128504 | 11/1986 |
| EP | 0103832 | 5/1989 |
| EP | 1028018 | 8/2000 |
| EP | 0799739 | 12/2002 |
| FR | 2494176 | 5/1985 |
| FR | 2777601 | 10/1999 |
| GB | 2058692 | 4/1981 |
| GB | 2166103 | 4/1986 |
| GB | 2238041 | 5/1991 |
| GB | 2299073 | 9/1996 |
| GB | 2323346 | 9/1998 |
| GB | 2346873 | 8/2000 |
| JP | S557405 | 1/1980 |
| JP | S5511823 | 1/1980 |
| JP | S5511846 | 1/1980 |
| JP | S5525380 | 2/1980 |
| JP | S5579121 | 6/1980 |
| JP | S55105539 | 8/1980 |
| JP | S5628831 | 3/1981 |
| JP | S5651333 | 5/1981 |
| JP | S5855227 | 4/1983 |
| JP | S6189824 | 5/1986 |
| JP | S61171321 | 8/1986 |
| JP | S61171322 | 8/1986 |
| JP | S62116312 | 5/1987 |
| JP | S62116313 | 5/1987 |
| JP | S6474119 | 3/1989 |
| JP | H01247135 | 10/1989 |
| JP | H01285325 | 11/1989 |
| JP | H01290411 | 11/1989 |
| JP | H02171228 | 7/1990 |
| JP | H04103332 | 4/1992 |
| JP | H04103333 | 4/1992 |
| JP | H05229354 | 9/1993 |
| JP | H05305651 | 11/1993 |
| JP | H0585415 | 12/1993 |
| JP | H07137161 | 5/1995 |
| JP | H08156617 | 6/1996 |
| JP | H08244481 | 9/1996 |
| JP | H08276932 | 10/1996 |
| JP | H09301491 | 11/1997 |
| JP | H1089180 | 4/1998 |
| JP | 2847582 | 1/1999 |
| JP | H11105557 | 4/1999 |
| JP | H11348581 | 12/1999 |
| JP | 2000203281 | 7/2000 |
| JP | 2000211382 | 8/2000 |
| JP | 3330012 | 9/2002 |
| JP | 3415113 | 6/2003 |
| JP | 3443795 | 9/2003 |
| JP | 3555335 | 8/2004 |
| JP | 3735851 | 1/2006 |
| JP | 3945138 | 7/2007 |
| JP | 4035928 | 1/2008 |
| JP | 4093582 | 6/2008 |
| JP | 2009132296 | 6/2009 |
| JP | 2009132365 | 6/2009 |
| JP | 2009149004 | 7/2009 |
| JP | 2012031749 | 2/2012 |
| KR | 100223661 | 10/1999 |
| KR | 20020043724 | 6/2002 |
| NL | 8004662 | 3/1982 |
| RU | 2378163 | 1/2010 |
| SU | 583033 | 12/1977 |
| SU | 1055661 | 11/1983 |
| SU | 1757927 | 8/1992 |
| WO | 2012003896 | 1/2012 |

* cited by examiner

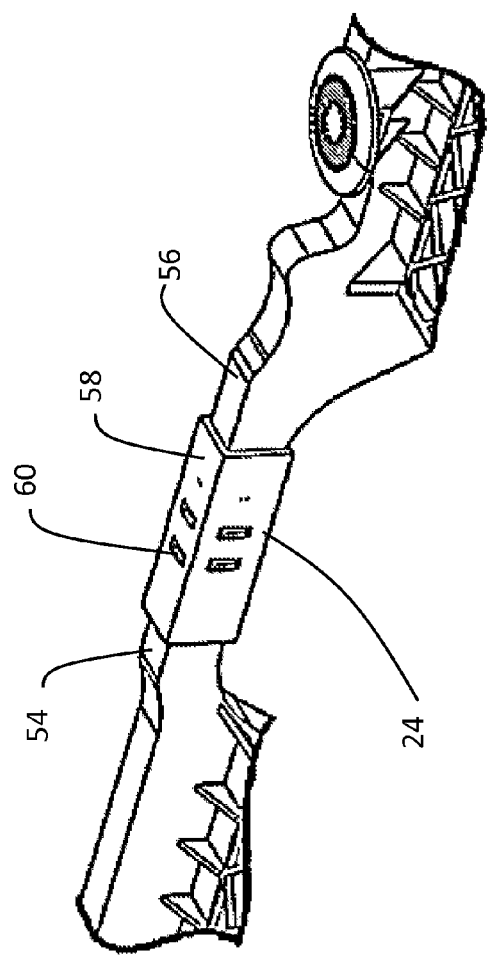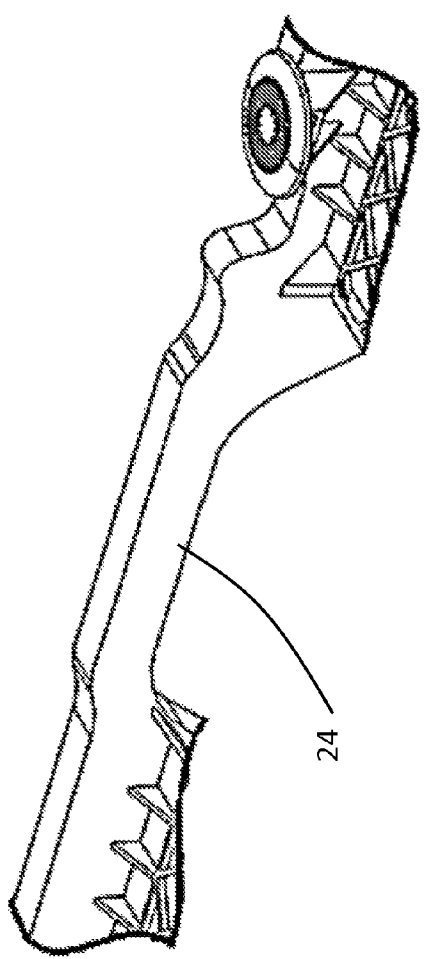

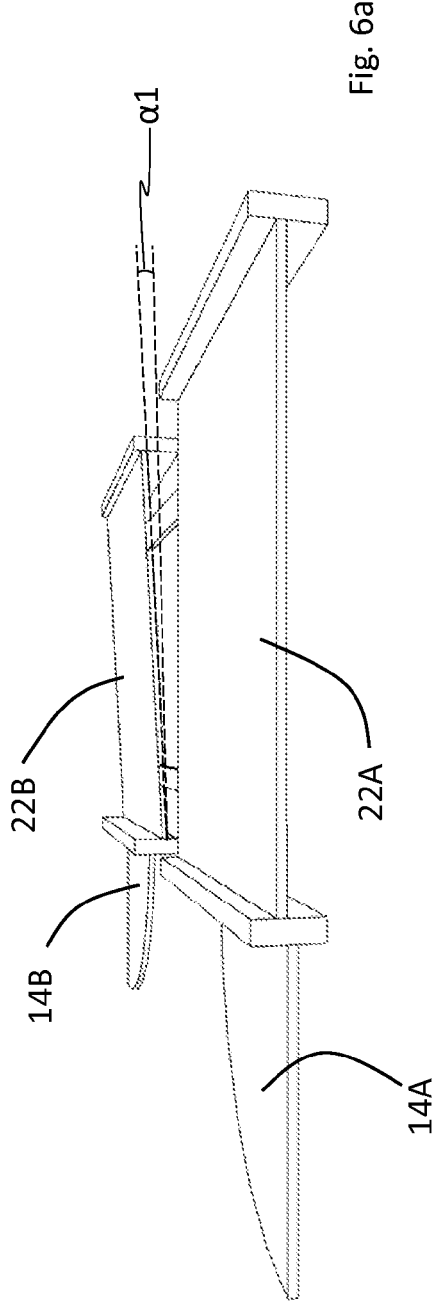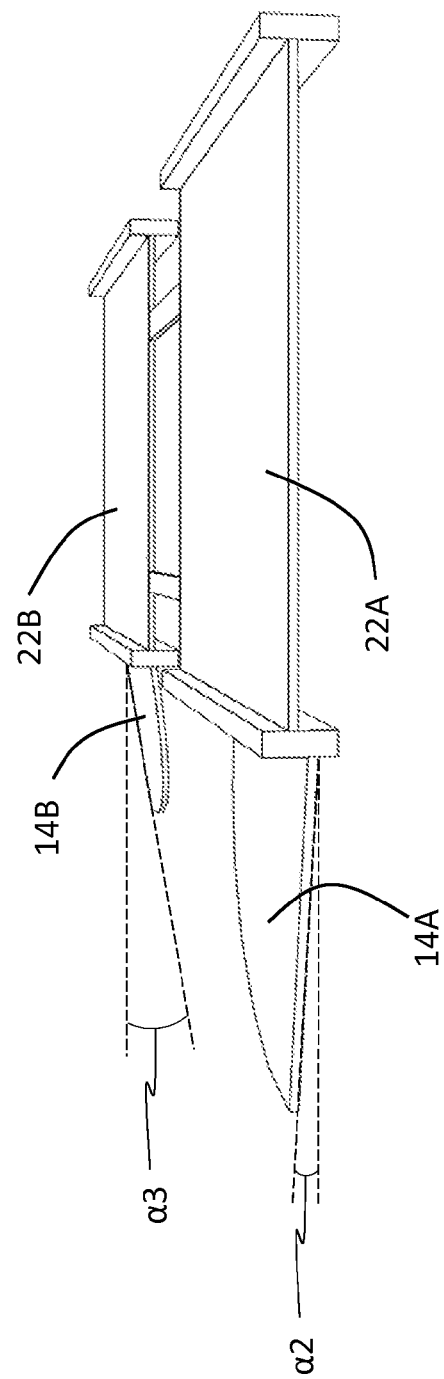

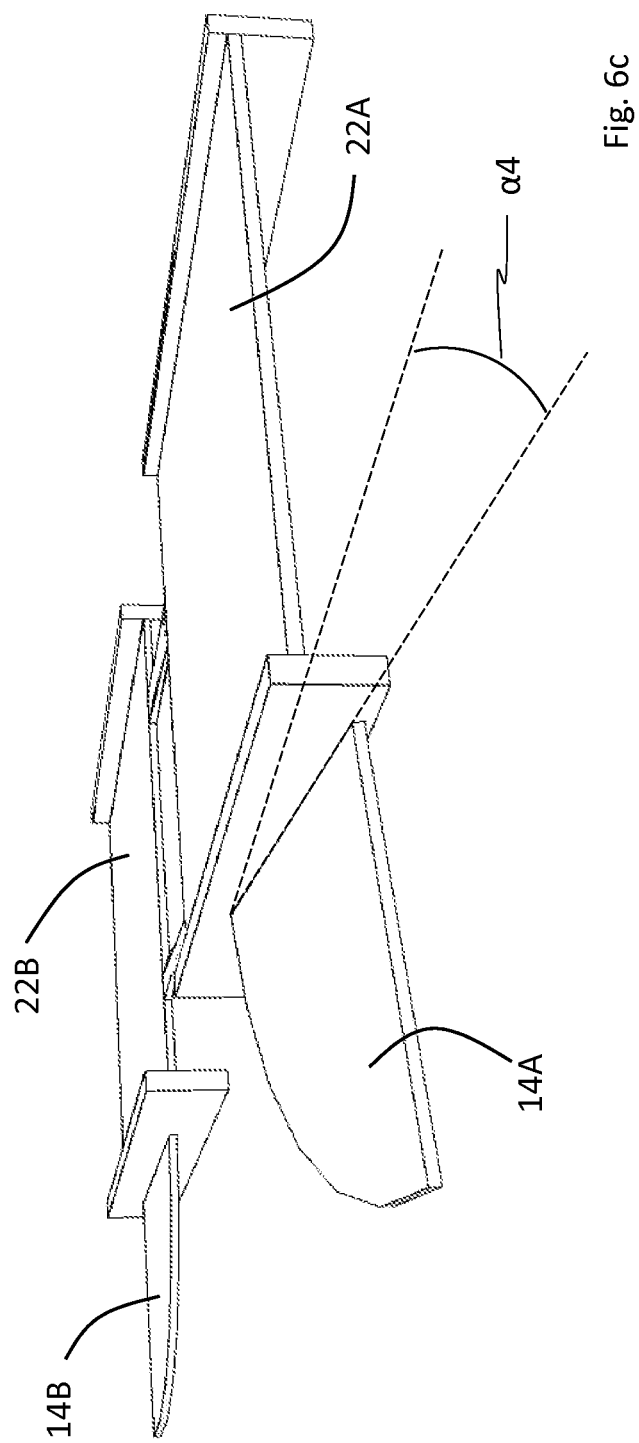

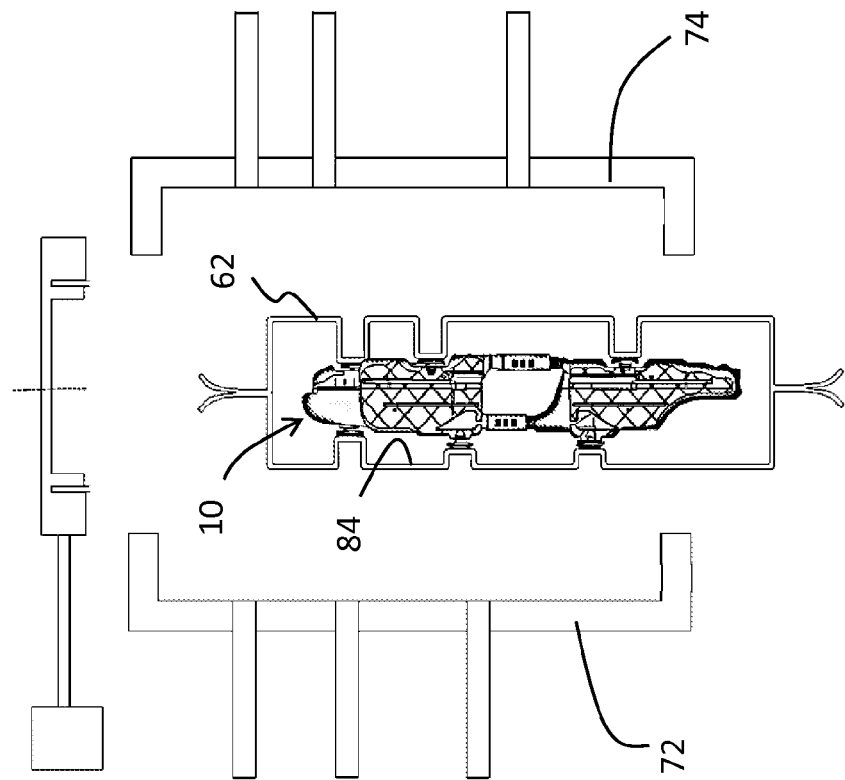
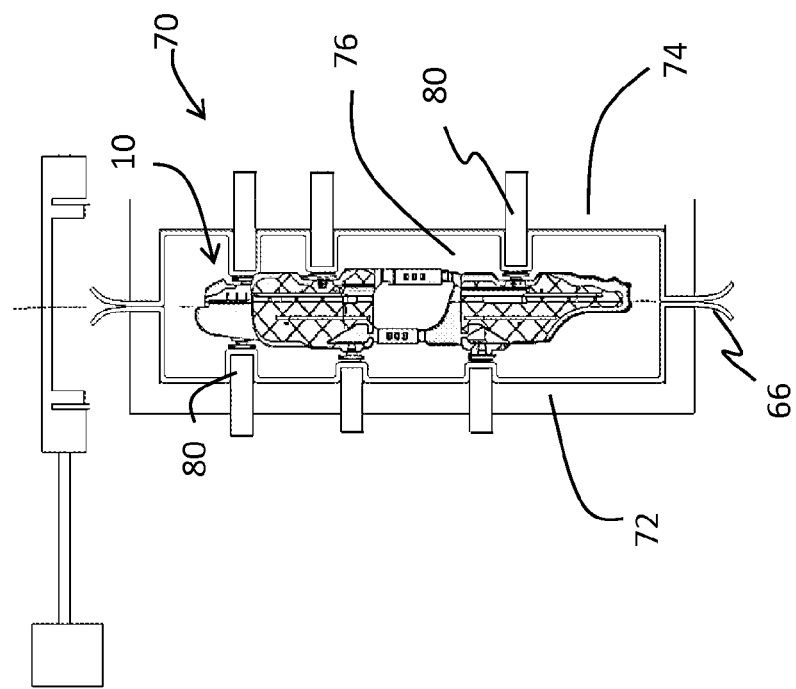

DEPLOYABLE FUEL TANK BAFFLE AND FUEL TANK SYSTEM

CROSS-REFERENCE TO RELATED APPLICATIONS

This application claims benefit under 35 U.S.C. § 119(e) to U.S. Provisional Patent Application No. 61/419,708, filed Dec. 3, 2010, entitled "Fuel Tank and Molding Process," which is incorporated by reference herein in its entirety.

FIELD OF THE INVENTION

The present invention relates to a method for the production of hollow plastic articles with inserted components. More specifically, the present invention relates to fuel tanks comprising a deployable internal baffle assembly.

BACKGROUND OF THE INVENTION

Fluids in reservoirs of motor vehicles propagate a nose when they hit a wall of reservoir or splash inside a reservoir. For example, during vehicle acceleration or deceleration an occupant of the vehicle may hear the noise of fuel moving inside a fuel tank. This problem is more apparent with hybrid vehicles that have less interior noise with an electric motor operating than when the combustion engine is operating.

A known solution to reducing the noise propagating from a fluid reservoir is to use a baffle that restricts and directs the motion of the fluid inside. Another solution is to use an open cell foam material or mesh material inside a tank that restricts and directs the motion of the fluid inside. There is a problem to inserting a noise reducing component inside a reservoir. There is a need for a means that is not cost prohibitive and does not negatively impact on productivity. There is a need for a means of inserting a noise reducing component without adversely affecting the permeability of the reservoir.

The blow molding process is a common technique to make hollow articles such as fuel tanks or portable transport containers. The disadvantage of this polymer processing method is that the integration of components inside the hollow plastic article after molding is very difficult and limited. For example, fuel tank components can be added after molding by inserting them through cut holes. These holes are subsequently covered by caps or with fuel tank components leaving an additional permeation path for fuel vapour permeation from the inside to the outside.

Another process known in the art is a twin-sheet forming process. Two half-shells are formed from sheets and welded together in a second step. It is possible to insert components between two half-shells before they are welded. A disadvantage of this thermoforming process over flow molding is that the thickness of the extruded sheet is uniform resulting in uneven thinning in the finished part in high blow ratio areas. Another disadvantage is that there is an additional time and energy required to heat up the two-shells in order to weld the shells.

Another process for producing hollow plastic articles is a twin-sheet blow molding process. The process encompasses forming a hollow parison with a blow molding extrusion apparatus, splitting the parison into two sheets, thermoforming the sheets to form half-shells before the welding process. The disadvantage of this process is that a capital investment is required for parison splitting and twin sheet handling devices with poorer productivity arising from operating, maintaining and cleaning the additional devices.

There is a need for a fluid reservoir with a noise reduction baffle and a method of manufacturing that overcome the aforementioned problems.

SUMMARY OF THE INVENTION

According to an aspect of an embodiment, provided is a fuel tank baffle assembly for installation in a fuel tank, the baffle assembly comprising a main body having a first end section, a second end section, and an intermediate section interconnecting the first and second end sections. Operably associated with the main body is at least one deployable auxiliary baffle structure. The auxiliary baffle structure is configured to be positioned in an undeployed state during installation into a fuel tank, thereby defining a first installation width of the baffle assembly. Following installation, the auxiliary baffle structure is deployed into an extended position, thereby defining an operational width for subsequent usage. The operational width is greater than the installation width.

According to another aspect of an embodiment, provided is a fuel tank system having an internal baffle assembly, the fuel tank system comprising a fuel tank, and a baffle assembly located within said fuel tank. The baffle assembly comprises a main body having a first end section, a second end section, and an intermediate section interconnecting the first and second end sections. Operably associated with the main body is at least one deployable auxiliary baffle structure. The auxiliary baffle structure is configured to be positioned in an undeployed state during installation into the fuel tank, thereby defining a first installation width of the baffle assembly. Following installation, the auxiliary baffle structure is deployed into an extended position, thereby defining an operational width for subsequent usage. The operational width is greater than the installation width.

According to a further aspect of an embodiment, provided is a process for producing a fuel tank provided with an internal deployable baffle assembly. The process comprises providing a molding station having first and second mold components together defining a mold cavity, and positioning therein a parison. Using a suitable carrier, a baffle assembly is positioned within the parison, the baffle assembly having deployable auxiliary baffle structures, wherein the baffle assembly is initially provided in a non-deployed state. Using displaceable mold cores provided in each of the first and second mold components, the parison is pressed against the baffle assembly, and the carrier is removed. The molding station is then closed, and a blow molding pressure is applied to the parison to urge it against the contour of the mold cavity. On completion, the molding station is opened, the fuel tank is removed, and the auxiliary baffle structures are deployed through an access port provided on the fuel tank.

BRIEF DESCRIPTION OF THE DRAWINGS

The foregoing and other features and advantages of the invention will be apparent from the following description of the invention as illustrated in the accompanying drawings. The accompanying drawings, which are incorporated herein and form a part of the specification, further serve to explain the principles of the invention and to enable a person skilled in the pertinent art to make and use the invention. The drawings are not to scale.

FIG. 4a is a partial perspective view of the baffle assembly, showing an adjustable configuration of the connector arms.

FIG. 4b is a partial perspective view of the baffle assembly, showing a fixed configuration of the connector arms.

FIG. 6a is a schematic representation of another embodiment of the baffle assembly, comprising a divider plate in angular relationship to the fluid plane.

FIG. 6b is a schematic representation of another embodiment of the baffle assembly, comprising auxiliary baffle structures in angular relationship to the fluid plane.

FIG. 6c is a schematic representation of another embodiment of the baffle assembly, comprising an auxiliary baffle structure in an alternate angular relationship to the fluid plane.

FIGS. 7a to 7d are a schematic representation of an exemplary manufacturing method for a fuel tank comprising the baffle assembly.

DETAILED DESCRIPTION OF EMBODIMENTS OF THE PRESENT INVENTION

Specific embodiments of the present invention will now be described with reference to the Figures, wherein like reference numbers indicate identical or functionally similar elements. The following detailed description is merely exemplary in nature and is not intended to limit the invention or the application and uses of the invention. A person skilled in the relevant art will recognize that other configurations and arrangements can be used without departing from the scope of the invention. Although the description and drawings of the embodiments hereof exemplify the technology with respect to automotive fuel tanks, the invention may also be used in other fuel tank applications in non-automotive fields. Furthermore, there is no intention to be bound by any expressed or implied theory presented in the preceding technical field, background, brief summary or the following detailed description.

Figure 1:
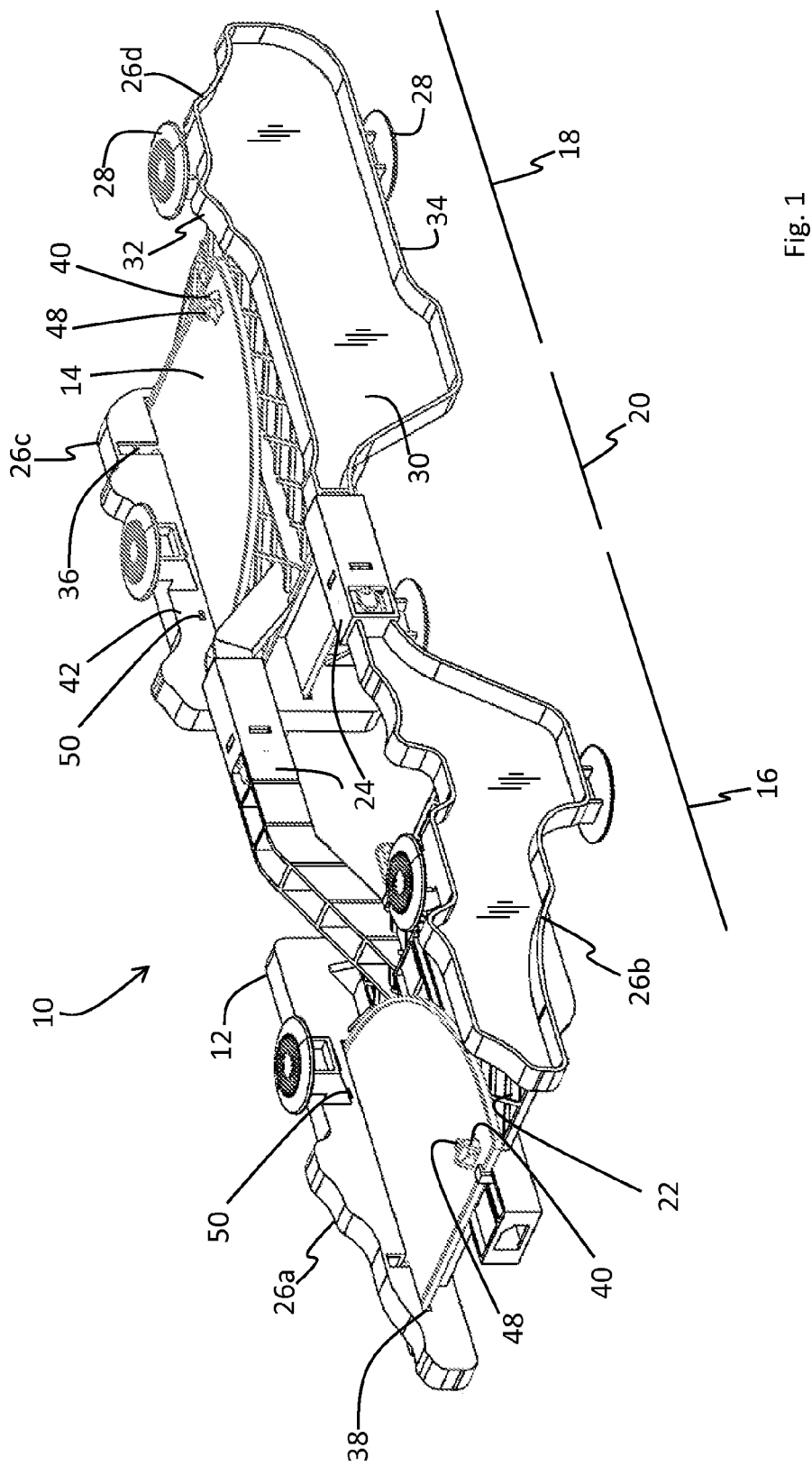
FIG. 1 is a perspective view of the baffle assembly according to an embodiment of the invention.
Figure 2:
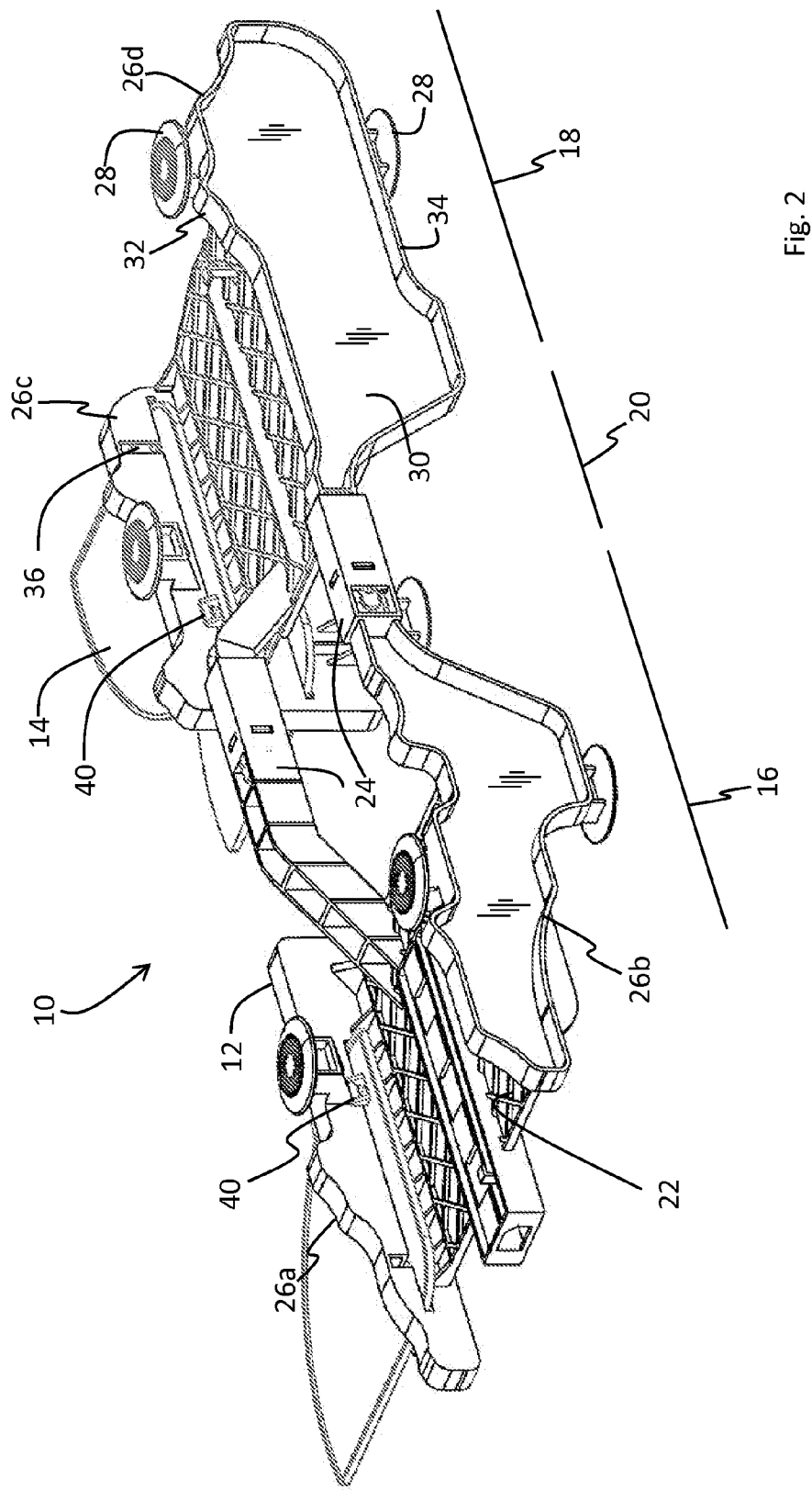
FIG. 2 is a perspective view of the baffle assembly of FIG. 1, showing the auxiliary baffle structures in the deployed position.

Turning now to FIGS. 1 and 2, shown is a baffle assembly 10 for use in an automotive fuel tank. Baffle assembly 10 is comprised of a main body 12, and at least one moveable auxiliary baffle structure 14 operably associated with main body 12. In the embodiment shown, and as detailed more clearly in FIG. 3, baffle assembly 10 comprises four auxiliary baffle structures 14.

Main body 12 provides a frame-like structure, and in the embodiment shown, is generally an elongate structure divided into three sections, namely a first end section 16, a second end section 18, and an intermediate section 20. Each of first and second end sections 16, 18 provide a divider plate 22 that acts as a barrier to the flow/slosh of fuel tank contents in the vertical direction in the region of first and second end sections 16, 18. Intermediate section 20 interconnects first and second end sections 16, 18, and is defined by at least one connector arm. In the embodiment shown, two connector arms 24 are present.

Interconnected to each divider plate 22 is one or more weld pad support structures. In the embodiment shown, there are four weld pad support structures 26a, 26b, 26c, 26d. It will be appreciated that each support structure 26(a-d) is provided with a custom configuration compatible with the location of the fuel tank in which baffle assembly 10 is located. As shown, each weld pad support structure is generally located in vertical orientation relative to the fluid plane of a fuel tank; although it will be appreciated that angular offsets from vertical may be implemented. In general, each support structure 26(a-d) provides a mounting location for one or more weld pads 28 that cooperate with the fuel tank internal side wall structure to locate and retain baffle assembly 10 in position. In the embodiment shown, each support structure 26(a-d) provides two weld pads 28 on opposing sides for engaging the internal wall structure of the fuel tank.

In some embodiments, one or more weld pad support structures 26(a-d) may be configured with a solid internal wall structure 30 interconnecting opposing walls 32, 34, so as to provided added strength between weld pads 28. In other embodiments, one or more weld pad support structures 26(a-d) may be provided with a lattice network (not shown) to provide added strength. Where the lattice network is open, fuel within the fuel tank is able to flow therethrough, with some wave or slosh-retarding effect.

Figure 3:
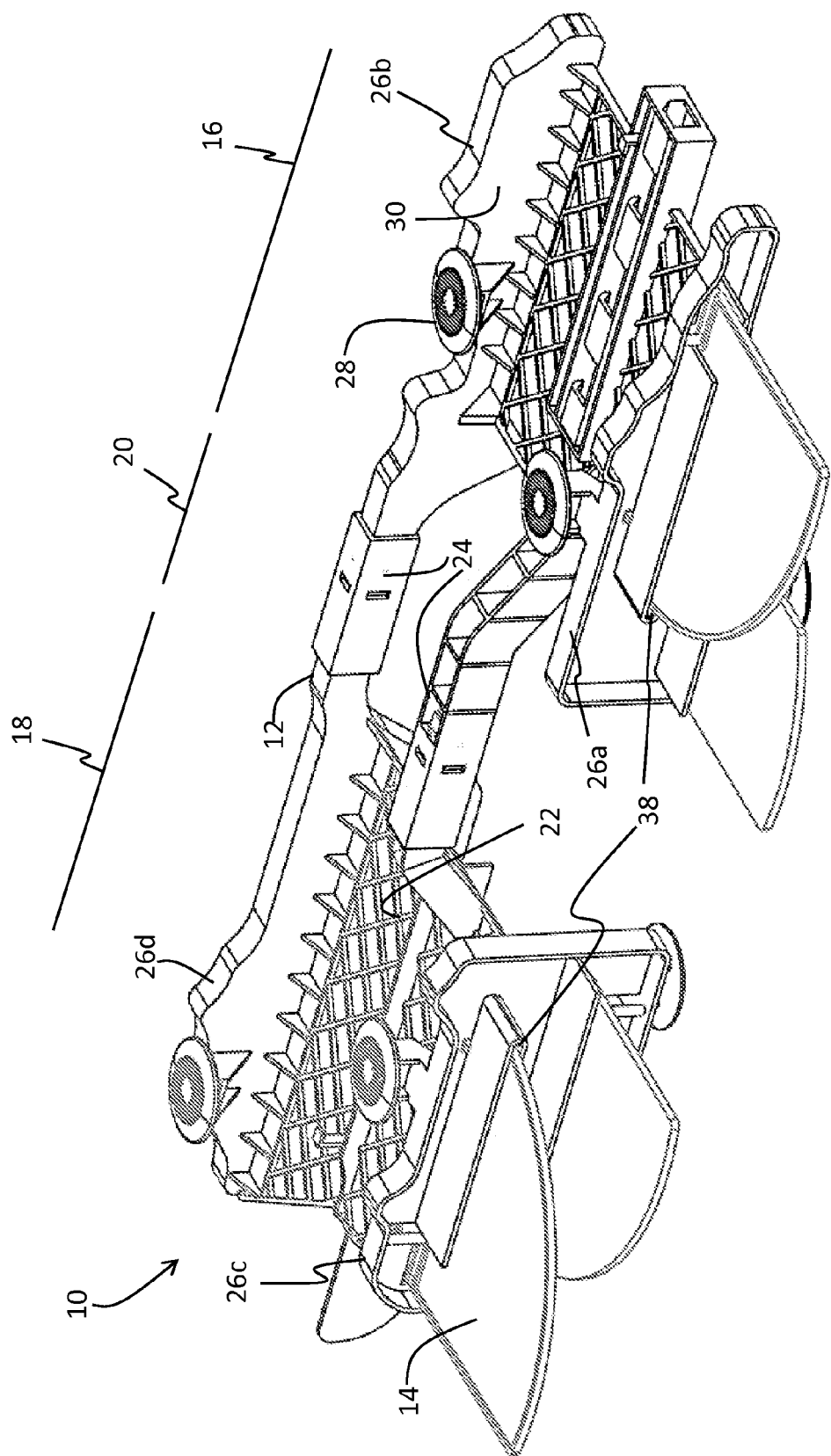
FIG. 3 is a second perspective view of the baffle assembly of FIG. 1 showing the auxiliary baffle structures in the deployed position.

One or more weld pad support structures, for example weld pad support structures 26a, 26c may be configured to support the deployment of one or more auxiliary baffle structures 14, for example as shown in FIGS. 2 and 3. Auxiliary baffle structure 14 is configured to deploy laterally once baffle assembly 10 is securely situated within the fuel tank. Each auxiliary baffle structure 14 is operably associated with a respective weld pad support structure 26(a/c) by way of a pivot hinge 36. Pivot hinge 36 permits auxiliary baffle structure 14 to pivot from a stowed position, as shown in FIG. 1, through a slot 38 provided in weld pad support structures 26(a/c) to the deployed position, as shown in FIGS. 2 and 3. Auxiliary baffle structure 14 provides a stop 40 to establish the limit of pivot relative to pivot hinge 36, stop 40 interacting with an inside wall 42 provided as part of the weld pad support structure. Auxiliary baffle structure 14 also provides at least one lock feature to lock it in the deployed position. As shown, auxiliary baffle structure 14 provides a lock feature 48 that cooperates with an aperture 50 provided on inside wall 42.

In the embodiment shown in FIG. 1, intermediate section 20 is comprised of two connector arms 24. To permit longitudinal length adjustments of baffle assembly 10, connector arms 24 are extendible/retractable. As such, and as detailed in the enlarged view of FIG. 4a, each connector arm 24 is comprised of a first arm component 54 and a second arm component 56, first and second arm components being coupled together by couple assembly 58. Couple assembly 58 is a nested or sliding sleeve arrangement of first arm component 54 relative to second arm component 56, but a range of coupling configurations could be used. Couple assembly 58 is provided with at least one lock positions 60, permitting connector arm 24 to be locked in one or a range of lengths, as required. Couple assembly 58 may also be configured to accommodate a longitudinal length reduction of the fuel tank during manufacture and baffle assembly 10 installation, generally caused by cooling and contraction of the fuel tank thermoplastic materials. It will be appreciated, however, that in some embodiments, connector arms 24 are fixed and non-adjustable, for example as shown in FIG. 4b.

Figure 5:
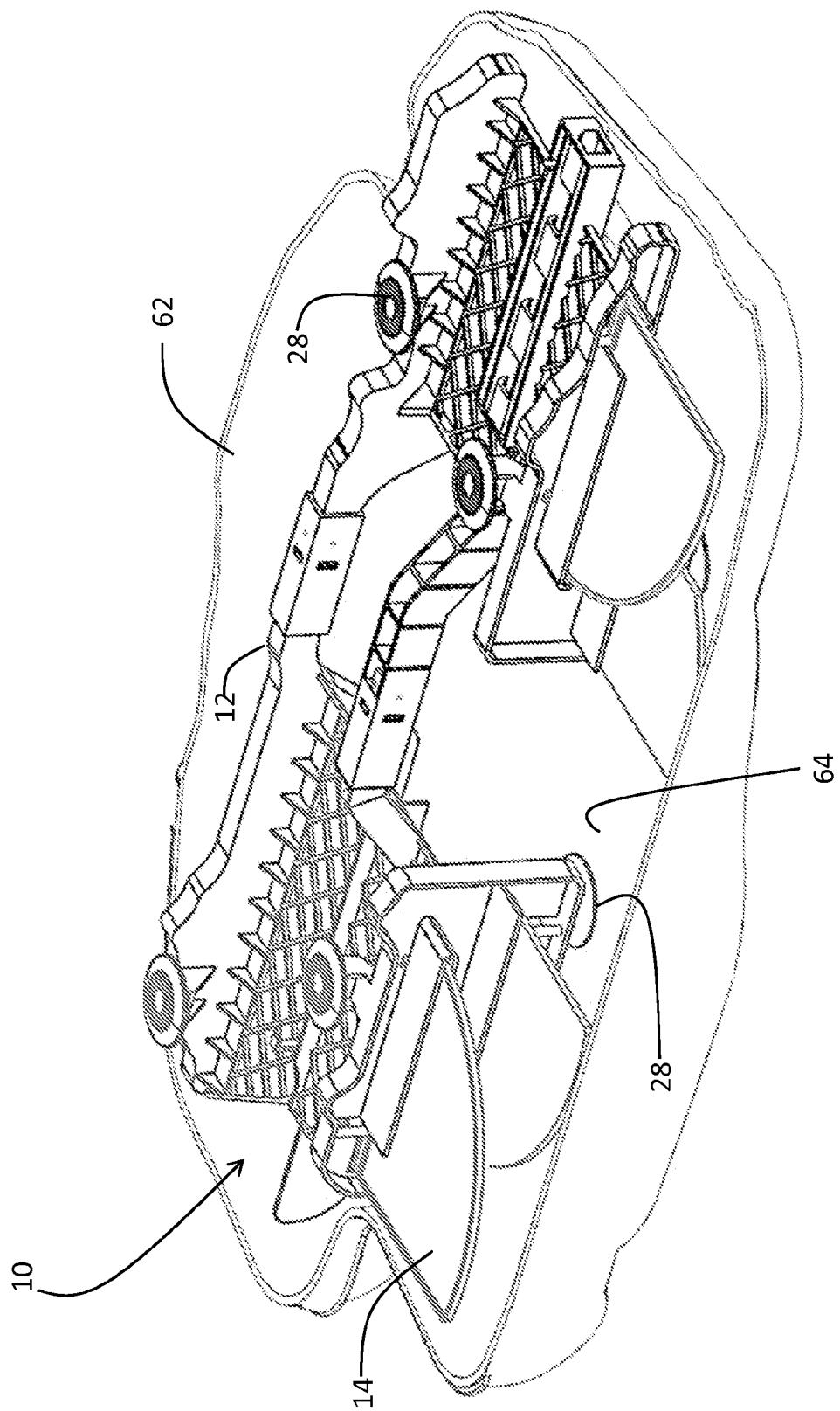
FIG. 5 is a perspective view of the baffle assembly of FIG. 1, showing the baffle assembly in a deployed arrangement relative to a fuel tank.

Turning now to FIG. 5, baffle assembly 10 is shown in relation to a fuel tank 62. Baffle assembly 10 is located and maintained in position within fuel tank 62 by way of weld pads 28. Weld pads 28 are generally provided with a substantially flat surface that engages the interior wall surface 64 of fuel tank 62. In some embodiments, weld pads 28 may be provided with additional features or surface treatments, such as holes to improve mechanical bonding. In other embodiments, the additional features may comprise an adhesive to promote chemical bonding.

Baffle assembly 10 is substantially horizontal in relation to the fluid plane within fuel tank 62. In some embodiments, baffle assembly 10 is located at the 40% to 60% fill level relative to the maximum fill level of the fluid in fuel tank 62. In some embodiments, baffle assembly 10, or components thereof may tilted in any direction, relative to the fluid plane. For example, as shown in the schematic drawing of FIG. 6a, baffle assembly 10 comprises divider plates 22A and 22B, where divider plate 22A is generally horizontal, and divider plate 22B is angularly disposed by angle $\alpha 1$ in relation to the fluid plane. In an alternate baffle assembly 10 shown in the schematic drawing of FIG. 6b, divider plates 22A, 22B are generally horizontal, with auxiliary baffle structure 14A being angularly disposed by angle $\alpha 2$, and auxiliary baffle structure 14B being angularly disposed by angle $\alpha 3$, as shown. In a still further alternate baffle assembly 10 shown in the schematic drawing of FIG. 6c, divider plates 22a, 22B and auxiliary baffle structure 14B are generally horizontal, with auxiliary baffle structure 14A angularly disposed by angle $\alpha 3$, as shown. As will be appreciated, the angular placement of each divider plate 22 and/or auxiliary baffle structures 14 can take on a range of combinations and/or configurations. The extent of tilt or angular displacement can be any value between 0° to 20°, with this value being influenced by the local geometry of the fuel tank, and the desired performance characteristics. For example, in some embodiments, the divider plates and/or auxiliary baffle structures may be tilted 17°. As will be appreciated, tilt angles greater than 20° may be implemented in certain applications.

Figure 7B:
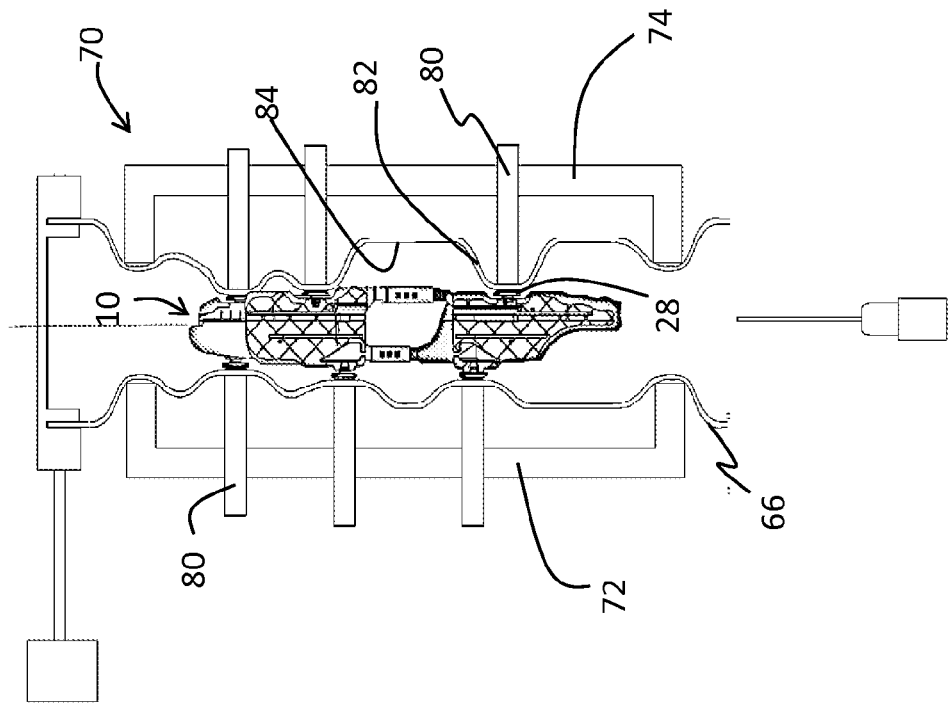
Figure 7A:
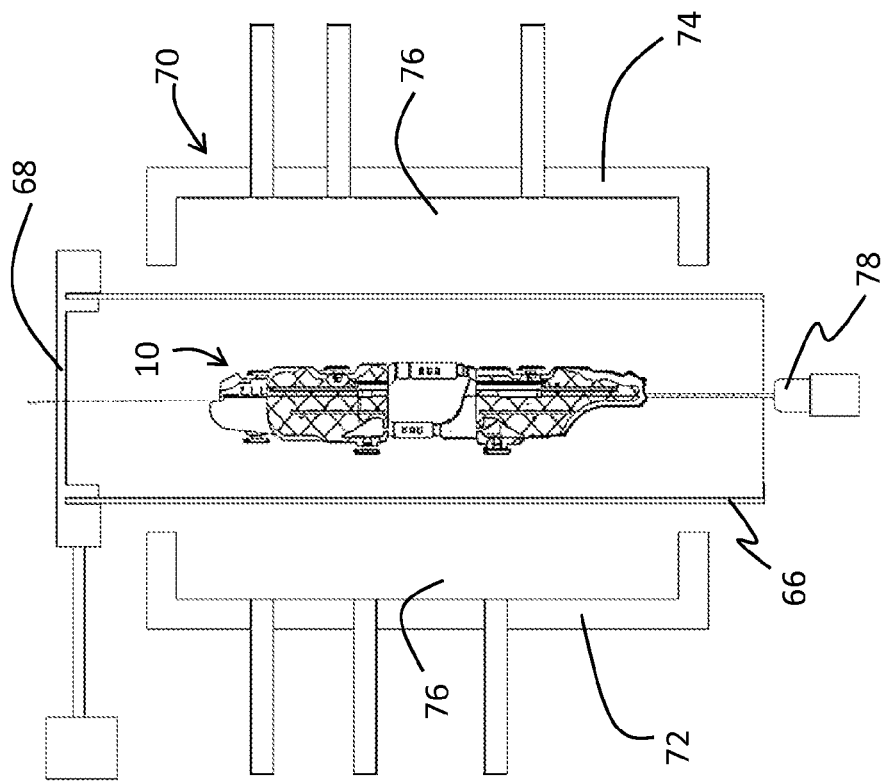

Baffle assembly 10 is generally incorporated into the fuel tank structure as a step in the manufacture of fuel tank 62, where fuel tank 62 is manufactured by way of blow molding. Having regard to FIG. 7a, the process is comprised of extruding a hollow parison 66 from an extrusion die head (not shown), and transferring the hollow parison using a suitable carrier device 68 to a blow molding station 70. Blow molding station 70 is generally comprised of two or more moveable mold components 72, 74 that cooperatively define a mold cavity 76. Using a suitable carrier platform 78, baffle assembly 10 is inserted into parison 66. Referring now to FIG. 7b, mold components 72, 74 are partially closed a predetermined distance, and one or more mold cores 80 are extended towards parison 66 forming a protrusion 82, contacting weld pads 28 of baffle assembly 10 at the inner surface of parison 84 at protrusion 82, and welding baffle assembly 10 to parison 66. As such, carrier platform 78 is detached from baffle assembly 10 and removed from mold station 70. As shown in FIG. 7c, mold components 72, 74 are then fully closed, thus sealing the edges of parison 66. With mold cavity 76 now fully defined, a blow molding pressure is applied through the one or more blow needles/pins (not shown). As such, parison 66 is caused to bear completely against the contour of mold cavity 76, forming the final blow-molded product.

Turning now to FIG. 7d, on completion of the blow molding step and cooling period, mold components 72, 74 are opened, and the resulting product, e.g. fuel tank 62 is removed and subjected to post-mold processing as necessary. The fuel tank 62 comprises baffle assembly 10 in permanent welded contact with the inside surface 84.

On inserting baffle assembly 10 into parison 66, auxiliary baffle structures 14 are in the un-deployed state, as shown for example in FIG. 1. As such, the installation width of baffle assembly 10 is limited to the diameter of parison 66, and generally is provided with a width that is less than this value. In some embodiments, however, the installation width of baffle assembly 10 may be equal to or greater than the diameter of parison 66 where additional processing equipment is used. For example, a larger width baffle assembly may be inserted where the blow molding station is equipped with stretcher pins to open and shape the parison to accommodate the wider baffle assembly.

Once fuel tank 62 is fully formed, baffle assembly 10 may be deployed either by hand, or using a suitable assembly aid. For example, an assembly aid may be configured to engage a geared mechanism provided on baffle assembly 10, so as to facilitate rotation into the deployed position. As will be appreciated, a range of assembly aids may be possible and suitably implemented to facilitate deployment. In general, access to baffle assembly 10 to effect deployment is provided by a center unit access port provided on fuel tank 62.

As will be appreciated, the blow molding process detailed above may be modified as necessary for process adjustments and optimization. For example, the molding station may additionally comprise pinch plates to close the parison prior to complete mold component closure, permitting an additional pre-blow processing stage.

While exemplified having regard to automotive fuel tanks, the technology described herein may applied to a range of other fuel tank applications, such as for off-road vehicles, marine vessels, lawn and garden devices and power tools.

While providing primarily an anti-slosh function, baffle assembly 10 may also be utilized as a structural element intended to reduce deformation of a fuel tank that may be pressurized above outside ambient pressure.

Baffle assembly 10 is generally constructed of thermoplastic material. Exemplary thermoplastic materials include, but are not limited to high density polyethylene, polypropylene, polyamide, acetal, polyester, fluoropolymer, polyphenylene sulphide, or a co-polymer of these materials selected to have appropriate physical resistance to the fluids in the fuel tank. In some embodiments, baffle assembly 10 may additionally comprise metal and/or thermoset plastic components. The thermoplastic materials may be filled or unfilled, or where a co-polymer or combination of materials is used, a combination of filled and unfilled thermoplastics.

Where fuel tank 62 is blow molded, it may be constructed from a mono-layer parison of thermoplastic material. Exemplary thermoplastic materials include, but are not limited to high density polyethylene, polypropylene, polyamide, acetal, polyester, fluoropolymer, polyphenylene sulphide, or a co-polymer of these materials selected to have appropriate physical resistance to the fluids to be contained by the fuel tank. The thermoplastic materials may be filled or unfilled with inorganic additives (e.g. minerals, glass, etc.), or where a co-polymer or combination of materials is used, a combination of filled and unfilled thermoplastics. In some embodiments, the thermoplastic may comprise a barrier resin. An exemplary thermoplastic containing a barrier resin is SELAR™.

In some embodiments, a blow molded fuel tank may be constructed from a multi-layer parison. For example, a multi-layer parison may be comprised of a thermoplastic first layer, and a barrier second layer. Where necessary, a further adhesive layer may be positioned between the thermoplastic and barrier layer. Exemplary thermoplastic materials include, but are not limited to high density polyethylene, polypropylene, polyamide, acetal, polyester, fluoropolymer, polyphenylene sulphide, or a co-polymer of these materials selected to have appropriate physical resistance to the fluids to be contained by the fuel tank. Suitable barrier layers include, but are not limited to ethylene vinyl alcohol, fluoropolymer, polyamide, acetal, polyester polyphenylene sulphide or a co-polymer of these materials selected to have appropriate barrier characteristics.

While various embodiments according to the present invention have been described above, it should be understood that they have been presented by way of illustration and example only, and not limitation. It will be apparent to persons skilled in the relevant art that various changes in form and detail can be made therein without departing from the scope of the invention. Thus, the breadth and scope of the present invention should not be limited by any of the above-described exemplary embodiments, but should be defined only in accordance with the appended claims and their equivalents. It will also be understood that each feature of each embodiment discussed herein, and of each reference cited herein, can be used in combination with the features of any other combination. All patents and publications discussed herein are incorporated by reference herein in their entirety.

What is claimed is:

1. A fuel tank baffle assembly for installation in a fuel tank, the baffle assembly comprising:
   a main body having a first end section, a second end section, and an intermediate section interconnecting said first and second end sections, each of said first end section and said second end section including a respective divider plate which extends in a first direction, each said divider plate facing in a second direction transverse to said first direction to serve as a primary baffle structure; and
   at least one deployable auxiliary baffle structure operably associated with said main body, said auxiliary baffle structure facing at least one of said divider plates in said second direction
   wherein said auxiliary baffle structure is configured to be positioned in an undeployed state in facing relation with said divider plate during installation into a fuel tank, thereby defining a first installation width of said baffle assembly in said first direction, and
   wherein said auxiliary baffle structure is deployable into an extended position extending in said first direction, thereby defining an operational width for subsequent usage, where said operational width is greater than said installation width in said first direction.

2. The fuel tank baffle assembly according to claim 1, wherein said first end section and said second end section each include said divider plate disposed between two generally vertical weld pad support structures oriented transverse to said divider plates.

3. The fuel tank baffle assembly according to claim 2, wherein each weld pad support structure provides at least one weld pad spaced from said divider plates in said second direction for engagement with an internal wall structure of the fuel tank.

4. The fuel tank baffle assembly according to claim 3, wherein each said weld pad support structure provides two weld pads spaced from each other in said second direction so as to be disposed on opposing sides of each said divider plate for engagement with said internal wall structure of said fuel tank.

5. The fuel tank baffle assembly according to claim 2, wherein said at least one deployable auxiliary baffle structure is operably associated with a respective weld pad support structure through a pivot hinge, permitting said auxiliary baffle structure to deploy laterally in said first direction through a slot provided in one of said weld pad support structures.

6. The fuel tank baffle assembly according to claim 1, wherein said main body is disposed between the 40% to 60% fill level of a fuel tank.

7. The fuel tank baffle assembly according to claim 1, wherein said main body is positioned at an angle up to 20% in any direction relative to the fluid plane within said fuel tank wherein said fuel plane extends in said first direction.

8. The fuel tank baffle assembly according to claim 2, wherein said main body is positioned generally parallel to the fluid plane, and wherein at least one of said divider plates on said main body is disposed at an angle up to 20%>in any direction relative to the fluid plane.

9. The fuel tank baffle assembly according to claim 2, wherein said main body is positioned generally parallel to the fluid plane, and wherein at least one of said auxiliary baffle structures on said main body is disposed at an angle up to 20% in any direction relative to the fluid plane.

10. A fuel tank system comprising an internal baffle assembly, the fuel tank system comprising:
    a fuel tank;
    a baffle assembly located within said fuel tank, said baffle assembly comprising a main body having a first end section, a second end section, and an intermediate section interconnecting said first and second end sections, each of said first end section and said second end section including a respective divider plate which extends in a first direction, each said divider plate facing in a second direction transverse to said first direction to serve as a primary baffle structure; and
    at least one deployable auxiliary baffle structure operably associated with said main body, said auxiliary baffle structure facing said divider plates in said second direction,
    wherein said auxiliary baffle structure is configured to be positioned in an undeployed state in facing relation with said divider plates during installation into said fuel tank, thereby defining a first installation width of said baffle assembly in said first direction, and
    wherein said auxiliary baffle structure is deployable into an extended position, extending in said first direction to thereby define an operational width of said main body for subsequent usage, where said operational width is greater in said second direction than said installation width.

11. The fuel tank system according to claim 10, wherein said first end section and said second end section each comprise said divider plate disposed between two generally vertical weld pad support structures extending in said second direction between opposite walls of said fuel tank, wherein said weld pad support structures are welded to said fuel tank.

12. The fuel tank system according to claim 10, wherein said main body is disposed between the 40% to 60% fill level of a fuel tank.

13. The fuel tank system according to claim 10, wherein said main body is positioned at an angle up to 20% in any direction relative to the fluid plane within said fuel tank wherein said fluid plane extends in said first direction.

14. The fuel tank system according to claim 11, wherein said main body is positioned generally parallel to the fluid plane, and wherein at least one of said divider plates on said main body is disposed at an angle up to 20%>in any direction relative to the fluid plane.

15. The fuel tank system according to claim 11, wherein said main body is positioned generally parallel to the fluid plane, and wherein at least one of said auxiliary baffle structures on said main body is disposed at an angle up to 20% in any direction relative to the fluid plane.

16. The fuel tank system according to claim 11, wherein said main body and said installation width is wider than any aperture in said fuel tank.

17. A fuel tank baffle assembly for installation in a fuel tank, the baffle assembly comprising:
- a main body having a first end section, a second end section, and an intermediate section interconnecting said first and second end sections, said first end section and said second end section each including at least one divider plate which extends in a first direction and faces in a second direction transverse to said first direction to serve as a primary baffle structure; and
- at least one deployable auxiliary baffle structure operably associated with each said divider plate of said main body, said at least one deployable auxiliary baffle structure being movable in said first direction relative to each said divider plate between an undeployed position and a deployed position, each said divider plate and said auxiliary baffle structure in said deployed position defining an installation width for said main body in said first direction,
- wherein said auxiliary baffle structure being disposed in said undeployed state during installation into a fuel tank so as to be disposed within said first installation width of said baffle assembly, and
- wherein said auxiliary baffle structure being deployable into said deployed position extending in said first direction beyond said installation width to thereby define an operational width for subsequent usage, where said operational width is greater in said first direction than said installation width.

18. The fuel tank system according to claim 17, wherein said auxiliary baffle structure is disposed in facing relation with each said divider plate when in said undeployed position and extends beyond each said divider plate in said first direction when in said deployed position.

19. The fuel tank system according to claim 18, wherein said auxiliary baffle structure is disposed in facing relation with each said divider plate when in said undeployed position and extending beyond each said divider plate in said first direction when in said deployed position.

* * * * *